United States Patent [19]

Huffman

[11] Patent Number: 4,584,533

[45] Date of Patent: Apr. 22, 1986

[54] NON-COHERENT BPSK DEMODULATOR

[75] Inventor: Greg M. Huffman, Chandler, Ariz.

[73] Assignee: Motorola, Inc., Schaumburg, Ill.

[21] Appl. No.: 707,345

[22] Filed: Mar. 1, 1985

[51] Int. Cl.⁴ .................. H03K 9/10; H04L 27/22
[52] U.S. Cl. ................................ 329/50; 329/104; 329/122; 375/25; 375/80; 375/94
[58] Field of Search ............... 329/50, 104, 105, 106, 329/107, 110, 122, 124; 375/25, 52, 53, 54, 55, 56, 80, 83, 84, 85, 86, 87, 94, 1

[56] References Cited

U.S. PATENT DOCUMENTS

| | | | |
|---|---|---|---|
| 4,149,121 | 4/1979 | Gordy | 375/1 |
| 4,176,328 | 11/1979 | Brown et al. | 332/16 T |
| 4,203,071 | 5/1980 | Bowles et al. | 375/1 |
| 4,361,817 | 11/1982 | Stillwell | 332/9 T |

Primary Examiner—Siegfried H. Grimm
Attorney, Agent, or Firm—Lowell W. Gresham

[57] ABSTRACT

A non-coherent BPSK demodulator which responds to a predetermined pseudo-noise received data code to generate a series of pulses whose pulse widths indicate a timing difference between the received data code and a simulated data code is disclosed. Inverted portions of the predetermined data code are detected and corrected. Ambiguous pulses and pulses having inconsistent widths are removed from the generated series of pulses.

16 Claims, 3 Drawing Figures

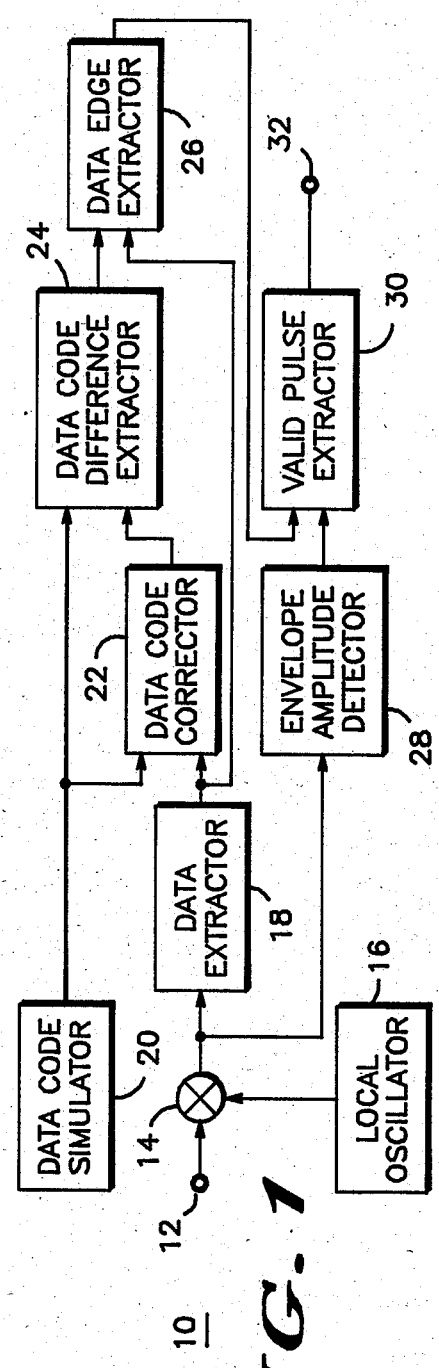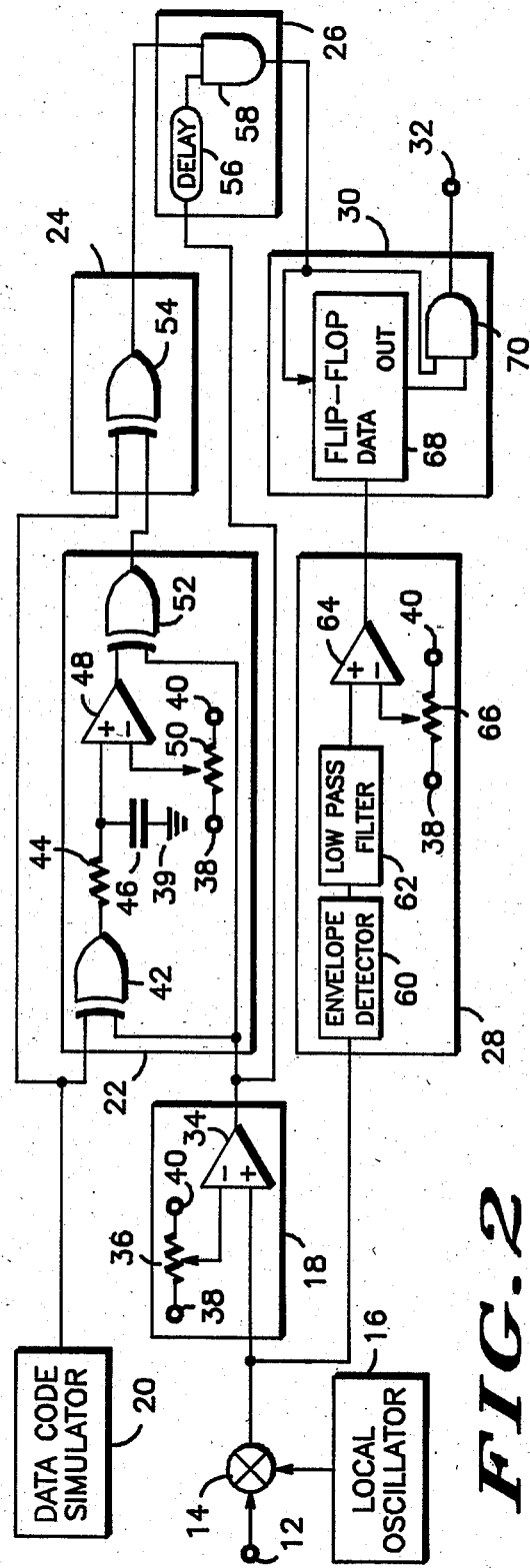

NON-COHERENT BPSK DEMODULATOR

BACKGROUND OF THE INVENTION

This invention relates to a demodulator circuit which receives a BPSK (Binary-Phase-Shift-Keyed) modulated carrier signal. More specifically, in the present invention the carrier signal is modulated with a particular pseudo-noise received data code. Further, the demodulator of the present invention anticipates, or has prior knowledge of, the particular pseudo-noise received data code.

The present invention is especially useful in conjunction with transponders and transponder testing. Transponders represent a class of radios which transmit a message, or data code, in response to a received signal from an inquiring device. Thus, an inquiring device, which transmits a signal to a transponder may anticipate the code which the transponder transmits.

A transponder may be useful for range measurement applications where distance is measured between the transponder and the inquiring device. In range measurement an inquiring device may be calibrated so that it "knows" when in time it will receive a transponder's transmitted code under conditions where both the transponder and inquiring device are adjacent each other in space. Then, when the transponder and inquiring device are separated in space, a delay in time of receipt of the transponder's transmitted code from the calibrated time conveys information concerning the distance between the inquiring device and the transponder. Greater distances produce greater delays.

The prior art inquiring devices in range measurement applications tend to utilize a coherent demodulator. Coherent demodulators precisely depulicate both the phase and frequency of a transmitted carrier signal in demodulating the received carrier signal. Thus, a coherent demodulator typically requires a phase locked loop type of circuit which is undesirable because it tends to be costly, complicated, and troublesome.

SUMMARY OF THE INVENTION

Accordingly, it is an object of the present invention to provide an improved BPSK demodulator which utilizes non-coherent demodulation.

Another object of the present invention concerns providing a method for demodulating a BPSK signal without requiring coherent demodulation.

Yet another object of the present invention concerns providing an apparatus which receives a BPSK modulated received data code and generates a series of pulses, the widths of which accurately correspond to a difference in time between receipt of the received data code and a simulated data code.

The above and other objects and advantages of the present invention are carried out in one form by a demodulator which contains a mixer, a data extractor, a data code corrector, a data code difference extractor, an envelope amplitude detector, and a valid pulse extractor. The mixer receives a carrier which is modulated with a received data code and outputs a modulated beat signal. The data extractor receives the modulated beat signal and outputs a signal which roughly corresponds to the received data code. The data code corrector receives the signal output from the data extractor and corrects it to more accurately correspond to the received data code by selectively inverting portions of it. The data code difference extractor receives a signal output from the data code corrector and a simulated data code and generates pulses which are responsive to the differences between the simulated and received data codes. The envelope amplitude detector receives the modulated beat signal and generates a signal which indicates when the absolute value of the modulated beat signal is greater than a predetermined value. Finally, the valid pulse extractor receives a signal output from the envelope amplitude detector and a signal output from the data code difference extractor and produces an output signal wherein ambiguous pulses from the data code difference extractor are blocked while valid pulses are permitted to pass.

BRIEF DESCRIPTION OF THE DRAWINGS

A more complete understanding of the present invention may be derived by reference to the detailed description and claims when considered in connection with the accompanying drawings, wherein:

FIG. 1 shows a block diagram of the present invention;

FIG. 2 shows particular embodiments of various portions of the FIG. 1 block diagram.

DETAILED DESCRIPTION OF THE PREFERRED EMBODIMENT

Figure 3:
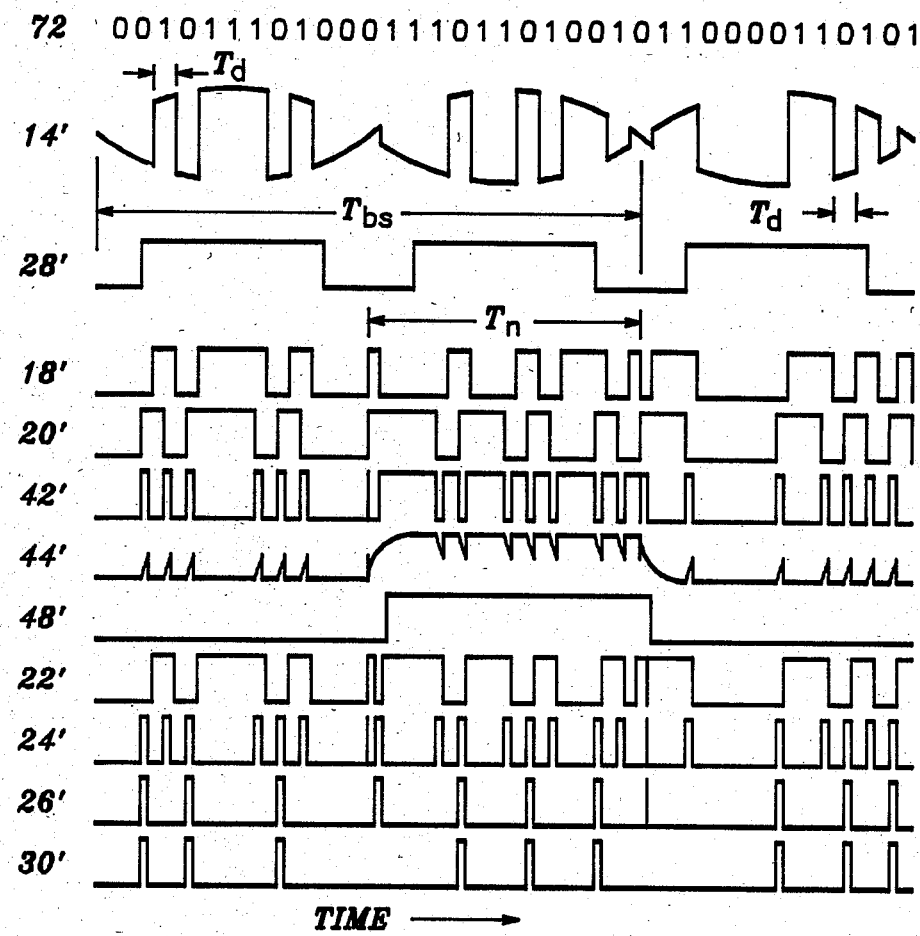
FIG. 3 shows a time diagram of the FIG. 2 embodiment of the present invention responding to an example received data code.

FIG. 1 shows a block diagram of a non-coherent BPSK demodulator 10. In FIG. 1 an input terminal 12 receives a BPSK (Binary-Phase-Shift-Keyed) modulated carrier signal. A pseudo-noise received data code modulates the carrier. Pseudo-noise codes represent binary codes wherein approximately one-half of the code exhibits one logical state and the other half of the code exhibits an opposing logical state. Terminal 12 connects to one input of a mixer 14.

A local oscillator 16 has an output which connects to another input of mixer 14. Local oscillator 16 generates an oscillation signal which exhibits an oscillation frequency that is relatively close to the frequency of the carrier. Mixer 14 down-converts the carrier signal in a conventional manner to produce a modulated beat signal at an output of mixer 14. The output of mixer 14 connects to both an input of a data extractor 18 and an input of an envelope amplitude detector 28.

The modulated beat signal which is received by data extractor 18 is modulated by the received data code. Thus, data extractor 18 separates the received data signal from the beat signal and outputs a representation of the received data code at an output of data extractor 18. However, the beat signal inverts the received data code during one-half of a beat signal cycle. Accordingly, one-half of an extracted received data code presented at the output of data extractor 18 is inverted relative to the received data code.

A data code simulator has an output which supplies a simulated version of the received data code. Accordingly, data code simulator 20 anticipates the particular received data code which is received by demodulator 10 at terminal 12 and duplicates the received data code at an output of data code simulator 20.

The received data code exhibits a data frequency. Likewise, a simulated data code output from data code simulator 20 exhibits a frequency which approximately equals the data frequency. Additionally, the received data code is presented to terminal 12 starting at a particular point in time and exhibits a data time period which inversely corresponds to the data frequency mentioned above. Portions of the simulated data code which correspond to identical portions of the received data code appear at the output of data code simulator 20 within one-half of a data time period from when the received data code appears at terminal 12.

The output of data code simulator 20 connects to an input of a data code corrector 22. Furthermore, the output from data extractor 18 connects to an input of data code corrector 22. Data code corrector 22 utilizes both the simulated data code and the extracted received data code to identify and correct the inverted portions of the extracted received data code. Accordingly, data code corrector 22 presents a corrected received data code at an output of data code corrector 22.

A data code difference extractor 24 has two inputs. One of the two inputs connects to the output of data code simulator 20, and the other connects to the output of data code corrector 22. Data code difference extractor 24 generates a series of pulses at an output of data code difference extractor 24. These pulses correspond to periods in time when the simulated data code differs from the corrected received data code. The simulated data code and the corrected received data code represent two versions of the same code, but the two codes may be shifted in time up to one-half of a data time period from each other. As a result, data code difference extractor 24 generates one pulse for each change in the logical state of this code. Furthermore, the widths of these pulses indicate the amount the received data code is shifted in time relative to the simulated data code.

A data edge extractor 26 has one input which connects to the output of data code difference extractor 24 and another input which connects to the output of data extractor 18. Data edge extractor 26 permits either only rising edge changes in the logical state of the received data code or only falling edge changes in the logical state of the code to appear at an output of data edge extractor 26.

As mentioned above, data code difference extractor 24 generates a pulse each time the code changes logical state. A rising edge difference occurs whenever the code changes from a logical 0 to a logical 1 state. Likewise, a falling edge difference occurs whenever the code changes from a logical 1 to a logical 0 state. Although data code difference extractor 24 generates a pulse for both rising and falling edges, the width of the rising edge pulses may not precisely equal the width of the falling edge pulses for identical differences in time. Thus, data edge extractor 26 blocks either rising or falling edge pulses so that only pulses of consistent width are presented at the output of data edge extractor 26.

Envelope amplitude detector 28 detects whether the absolute value of the beat signal is greater than a predetermined value. Thus, the signal produced by envelope amplitude detector 28 indicates that the beat signal exhibits a relatively large value. This signal is useful in predicting which pulses generated by data code difference extractor 24 accurately reflect timing differences between the received and simulated data codes.

A valid pulse extractor 30 has one input which connects to the output of data edge extractor 26 and another input which connects to the output of envelope amplitude detector 28. The beat signal output from mixer 14 represents a sine wave, which at times exhibits a near zero amplitude. The near zero amplitude of the beat signal decreases the signal-to-noise ratio of the received data code. This decreased signal-to-noise ratio, and the switching that occurs when the received data code becomes inverted by the beat signal, together cause an ambiguous pulse effect which ripples through data extractor 18, data code corrector 22, data code difference extractor 24, and data edge extractor 26. Thus, ambiguous pulses may be presented at the output of data edge extractor 26. Such pulses are ambiguous because their pulse width may not accurately reflect the timing difference between the received data code and the simulated data code. Accordingly, valid pulse extractor 30 utilizes the signal output from envelope amplitude detector 28 to select which of the pulses output from data edge extractor 26 are not ambiguous, or are valid, and present only these pulses at an output of valid pulse extractor 30. The output of valid pulse extractor 30 connects to an output terminal 32 which represents the output from non-coherent BPSK demodulator 10.

FIG. 2 expands the block diagram depicted in FIG. 1 to show specific implementations of various portions of the present invention. FIG. 3 is a timing diagram showing representative signals of the FIG. 2 embodiment. The FIG. 3 timing diagram shows a response to an example pseudo-noise received data code which is shown in trace 72. This particular received data code is exemplified merely for the purpose of teaching the present invention. Accordingly, the present invention is not limited to processing the specific received data code shown in trace 72.

FIG. 2 contains local oscillator 16 and mixer 14 coupled together as described above in conjunction with FIG. 1. The modulated beat signal output from mixer 14 is shown in trace 14' of FIG. 3. The beat signal exhibits a phase shift of either 0° or 180° depending upon the logical state of the received data code. The beat signal exhibits a time period $T_{bs}$ and a corresponding beat frequency which is inversely proportional to time period $T_{bs}$.

Data extractor 18 is implemented using a comparator circuit. Accordingly, a comparator 34 has a noninverting input connected to the output of mixer 14, and an inverting input connected to a tap node of a variable resistor 36. Variable resistor 36 has a first node connected to a terminal 38, which is adapted to receive a positive potential relative to a ground, or common potential, 39. Variable resistor 36 has a second node connected to terminal 40, which is adapted to receive a negative potential relative to ground 39. An output of comparator 34 serves as the output of data extractor 18 and connects to an input of data code corrector 22 and to an input of data edge extractor 26.

The tap of variable resistor 36 provides a predetermined potential to the inverting input of comparator 34. In the present embodiment the tap is adjusted so that comparator 34 functions as a zero-crossing detector. Thus, an analog beat signal is converted into a digital signal which may exhibit either of two possible logical states. The beat signal shown in trace 14' of FIG. 3 enters data extractor 18, and causes data extractor 18 to produce the extracted received data code, as shown in trace 18'. The beat signal represents a sine wave, and therefore exhibits a negative value for one-half of a beat time period $T_{bs}$. For the example shown in FIG. 3, this negative one-half time period is denoted as $T_n$. Since the beat signal is inverted during time period $T_n$, the extracted received data code 18' also presents inverted data relative to received data code 72. Furthermore, ambiguous pulses as described above are shown at both the beginning and end of time period $T_n$.

Trace 20' shows an example of the simulated data code output from data code simulator 20. Simulated data code 20' duplicates the received data code shown in trace 72, and is presented at the output of data code simulator 20 less than one-half of a data time period prior to the receipt of the received data code. A data time period is shown in trace 14' as $T_d$.

Data code corrector 22 consists of two parts, as shown in FIG. 2. An inversion detector represents the first part. The invention detector deceiphers which of two possible one-half beat signal time periods $T_{bs}$ represents the inversion time period $T_n$. The inversion detector is implemented using an Exclusive-OR element 42, a low pass filter, and a comparator 48. A first input of Exclusive-OR element 42 connects to the output of data code simulator 20, and a second input of Exclusive-OR element 42 connects to the output of data extractor 18. The low pass filter consists of a resistor 44 and a capacitor 46. A first node of resistor 44 connects to an output of Exclusive-OR element 42, and a second node of resistor 44 connects to a first node of capacitor 46 and a non-inverting input of comparator 48. A second node of capacitor 46 connects to ground 39. An inverting input of comparator 48 connects to a tap node of variable resistor 50. A first node of variable resistor 50 connects to terminal 38 and a second node of variable resistor 50 connects to terminal 40.

Exclusive-OR element 42 produces a signal depicted in trace 42' of FIG. 3. A logical 1 level is produced whenever the extracted received data code 18' differs from simulated data code 20'. Extracted received data code 18' and simulated data code 20' seldom differ when extracted received data code 18' is not inverted relative to pseudo-noise code 72. However, when the extracted received data code is inverted, the simulated data code and extracted received data code seldom exhibit the same logic level as is shown during time period $T_n$.

Trace 44' shows the output of the low pass filter. The low pass filter reduces the amplitude of pulses caused by the above described seldom-occurring events. As shown in trace 44', the signal output from the low pass filter tends to exhibit a logical 0 level when the extracted received data code is not inverted and a logical 1 level when the extracted received data code is inverted.

The output of comparator 48 is shown in trace 48' of FIG. 3. Comparator 48 removes the transient voltage levels which were present in traces 42' and 44' to provide a clean digital signal to serve as the output of the inversion detector. Thus, the tap node of variable resistor 50 is adjusted so that a voltage level of approximately one-half the potential difference between logical 0 and logical 1 states is presented to the inverting input of comparator 48. Comparator 48 may further include some positive feedback (not shown) provided in a conventional manner, to achieve a hysteresis effect.

An inversion compensator serves as the second portion of data code corrector 22. The inversion compensator corrects inverted portions of the received data code. In this embodiment, an Exclusive-OR element 52 serves as the inversion compensator. A first input of Exclusive-OR element 52 connects to the output of comparator 48, and a second input of Exclusive-OR element 52 connects to the output of data extractor 18. An output of Exclusive-OR element 52 serves as both the output of the inversion compensator and of data code corrector 22. Trace 22', shown in FIG. 3, shows the corrected data code. Except for points in time near the beginning and end of time period $T_n$, the corrected received data code shown in trace 22' duplicates the received data code shown in trace 72.

Data code difference extractor 24 is shown in FIG. 2 as an Exclusive-OR element 54. A first input of Exclusive-OR element 54 connects to the output of data code simulator 20 and a second input of Exclusive-OR element 54 connects to the output of data code corrector 22. The output of Exclusive-OR element 52 serves as the output of data code difference extractor 24.

An example signal output from data code difference extractor 24 is shown in trace 24' (See FIG. 3). A logical 1 pulse is generated whenever the corrected received data code and the simulated data code differ. One pulse is generated each time the received data code changes states. Thus, pulses are generated for both rising and falling edges of the received data code. Additionally, pulses or mere transient voltage levels may represent ambiguous pulses near the beginning and end of time period $T_n$.

A delay element 56 and an AND element 58 are utilized within data edge extractor 26 in the FIG. 2 embodiment. An input of delay element 56 connects to the output of data extractor 18 and an output of delay element 56 connects to an inversion input of AND element 58. A second input of AND element 58 connects to the output of data code difference extractor 24. An output of AND element 58 serves as the output of data edge extractor 26.

In the FIG. 2 embodiment, the extracted received data code is applied to both an input of Exclusive-OR element 52 and delay element 56. A propagation delay associated with Exclusive-OR element 52 and Exclusive-OR element 56 occurs before a corresponding difference pulse is applied to the second input of AND element 58. Accordingly, delay element 56 is chosen to compensate for this propagation delay. Conventional techniques known to those skilled in the art may be used in the implementation of delay element 56. Such techniques may include the use of series-connected logic gates, coaxial cables, or delay lines.

The output signal from data edge extractor 26 is shown in trace 26'. Trace 26' shows that the pulses of trace 24' which correspond to 1-to-0, or falling edge, changes of the received data code are blocked. Accordingly, only those pulses of trace 24' which correspond to 0-to-1 or rising edge, changes in the received data code are presented at the output of data edge extractor 26.

Envelope amplitude detector 28 is shown in FIG. 2 as containing an envelope detector 60, a low pass filter 62, and a comparator 64. An input to envelope detector 60 connects to the output of mixer 14, and an output of envelope detector 60 connects to an input of low pass filter 62. An output of low pass filter 62 connects to a non-inverting input of comparator 64. An inverting input of comparator 64 connects to a tap node of variable resistor 66. A first node of variable resistor 66 connects to terminal 38, and a second node of variable resistor 66 connects to terminal 40. The output of comparator 64 serves as the output of envelope amplitude detector 28.

Envelope detector 60 converts the beat signal shown in trace 14' of FIG. 3 into a unipolar signal exhibiting only a positive or only a negative polarity. Low pass filter 62 removes transient voltage levels which may occur due to the phase shifting of the beat signal. The tap node of variable resistor 66 is adjusted so that the output of comparator 64 exhibits a high logical level whenever the output for low pass filter 62 exceeds a predetermined level.

Trace 28', shown in FIG. 3, exemplifies a signal output from envelope amplitude detector 28. A high level signifies that the absolute value of the amplitude of the beat signal exceeds a predetermined level.

A memory element, such as flip-flop 68, and an AND element 70 are used to implement valid pulse extractor 30 (See FIG. 2). A data input to flip-flop 68 connects to the output of envelope amplitude detector 28, and a clock input of flip-flop 68 connects to an output of data edge extractor 26. The output of data edge extractor 26 also connects to an input of AND element 70, and another input of AND element 70 connects to an output of flip-flop 68. An output of AND element 70 serves as the output of valid pulse extractor 30 and connects to terminal 32. AND element 70 prevents the ambiguous pulses which occur near the beginning and end of time period $T_n$ from appearing at output terminal 32. This blocks the passage of the ambiguous pulses which are described above. Flip-flop 68 is inserted between envelope amplitude detector 28 and AND element 70 to prevent the signal shown in trace 28' from changing while one of the pulses shown in trace 26' is at a high logic level. To accomplish this function, in this specific embodiment flip-flop 68 clocks on the falling edges of the pulses output from data edge extractor 26, as shown in trace 26'.

The foregoing description uses a preferred embodiment to illustrate the present invention. However, those skilled in the art will recognize that changes and modifications may be made in this embodiment without departing from the scope of the present invention. For example, the Exclusive-OR elements described herein may be implemented using either Exclusive-OR gates, Exclusive-NOR gates, or combinations of other logical gates. Likewise, the AND elements described herein may be implemented using AND gates, NAND gates, OR gates, or NOR gates, depending upon a particular signal polarity convention, or by using combinations of various logical gates. Furthermore, those skilled in the art will recognize that the various signal polarity conventions described herein are merely for the purpose of explanation and are not intended to limit the scope of this invention.

What is claimed is:

1. A demodulator comprising:
   a mixer having a first input adapted to receive a carrier, the carrier being modulated with a received data code, and an output for supplying a modulated beat signal;
   a data extractor having an input coupled to said mixer output and an output, said data extractor being for removing the beat signal from the received data code;
   a data code corrector having a first input coupled to said data extractor output and having an output, said data code corrector being for selectively inverting portions of the received data code;
   a data code difference extractor having a first input adapted to receive a simulated data code, a second input coupled to said data code corrector output, and an output, said difference extractor being for generating pulses responsive to differences between the simulated and received data codes;
   an envelope amplitude detector having an input coupled to said mixer output and an output, said amplitude detector being for signalling when an absolute value of the modulated beat signal is greater than a predetermined value; and
   a valid pulse extractor having a first input coupled to said amplitude detector output and having a second input coupled to said difference extractor output, said pulse extractor being for blocking the passage of ambiguous pulses generated by said difference extractor.

2. A demodulator as claimed in claim 1 additionally comprising a local oscillator having an output for providing a oscillation signal at a first frequency, wherein:
   said mixer additionally comprises a second input and said mixer second input couples to said local oscillator output;
   the carrier signal modulated with the received data code oscillates at a second frequency;
   the received data code exhibits a data frequency;
   the beat signal exhibits a beat frequency; and
   the first frequency oscillates at a frequency relative to the second frequency so that the beat frequency is less than one-fifth of the data frequency.

3. A demodulator as claimed in claim 1 wherein said data extractor comprises a comparator having a first input coupled to the output of said mixer, a second input adapted to receive a predetermined potential and having an output coupled to said data code corrector.

4. A demodulator as claimed in claim 1 wherein said data code corrector additionally comprises a second input adapted to receive the simulated data code.

5. A demodulator as claimed in claim 4 additionally comprising a data code simulator having an output coupled to the second input of said data code corrector and to the first input of said difference extractor, said data code simulator being for generating the simulated data code, wherein:
   the received data code exhibits a data frequency and a data time period;
   said data code simulator generates the simulated data code at a frequency which approximately equals the data frequency; and
   said data code simulator generates the simulated data code so that corresponding portions of the simulated and received data codes occur within one-half of a data time period of each other.

6. A demodulator as claimed in claim 5 wherein said data code corrector comprises:
   an inversion detector having a first input coupled to said data extractor, a second input coupled to said data code simulator, and an output, said inversion detector being for detecting inverted portions of the received data code; and
   an inversion compensator having a first input coupled to said inversion detector output, a second input coupled to said data extractor, and an output coupled to said difference extractor, said inversion compensator being for correcting inverted portions of the received data code.

7. A demodulator as claimed in claim 6 wherein said inversion detector comprises:
   an Exclusive-OR element having a first input coupled to said data extractor, a second input coupled to said data code simulator, and an output;

a low pass filter having an input coupled to the output of said Exclusive-OR element and an output; and a comparator having a first input coupled to the output of said low pass filter, a second input adapted to receive to a predetermined potential and having an output coupled said difference extractor.

8. A demodulator as claimed in claim 1 wherein said difference extractor comprises an Exclusive-OR element having a first input adapted to receive the simulated data code, a second input coupled to said data code corrector, and an output coupled to said valid pulse extractor.

9. A demodulator as claimed in claim 1 wherein said envelope amplitude detector comprises:
an envelope detector having an input coupled to the output of said mixer and an output;
a comparator having a first input coupled to the output of said envelope detector, a second input adapted to receive a predetermined potential and having an output coupled to said valid pulse extractor.

10. A demodulator as claimed in claim 1 wherein said valid pulse extractor comprises:
a memory element having a data input coupled to said amplitude detector, a clock input coupled to said difference extractor, and an output, said memory element for sampling the signal output from said amplitude detector at a time when pulses generated by said difference extractor indicate the received and simulated data codes are approximately equal; and
an AND element having a first input coupled to said difference extractor and a second input coupled to the output of said memory element.

11. A demodulator as claimed in claim 1 additionally comprising a data edge extractor coupled between said difference extractor and said valid pulse extractor, wherein:
said difference extractor responds to both rising edge differences and falling edge differences of the received data code; and
said data edge extractor blocks passage of one of the rising and falling edge differences from said difference extractor.

12. A demodulator as claimed in claim 11 wherein said data edge extractor comprises an AND element having a first input coupled to said difference extractor, a second input coupled to said data extractor, and an output coupled to said valid pulse extractor.

13. A method of demodulating a BPSK signal modulated with a predetermined received data code, said method comprising the steps of:
down-converting the BPSK signal to produce a BPSK modulated beat signal having a beat signal envelope;
removing the received data code from the beat signal to produce an extracted received data code;
correcting inverted portions of the extracted received code to produce a corrected received data code;
extracting differences between the corrected received code and a simulated data code to produce a difference signal;
detecting when the amplitude of the absolute value of the beat signal envelope exceeds a predetermined level to produce a valid envelope signal; and
selectively extracting pulses from the difference signal in response to the valid envelope signal.

14. A method as claimed in claim 13 wherein the received data code exhibits a data frequency, the beat signal exhibits a beat frequency, and wherein said downconverting step comprises the step of mixing the BPSK signal with a signal from a local oscillator so that the beat frequency is less than one-fifth of the data frequency.

15. A method as claimed in claim 13 wherein the difference signal produced in said extracting differences step represents a series of pulses corresponding to both rising and falling edge changes of the received data code and additionally comprising the step of removing pulses corresponding to one of the rising and falling changes so that said selectively extracting step extracts only pulses corresponding to the other of the rising and falling edge changes.

16. A demodulator circuit for demodulating a BPSK carrier signal exhibiting a first frequency and being modulated with a predetermined received data code exhibiting a data frequency, said circuit comprising:
a mixer having a first input adapted to receive the carrier, a second input, and an output for providing a beat signal exhibiting a beat frequency;
a local oscillator having an output coupled to the second input of said mixer, said local oscillator output providing a local oscillator signal exhibiting a second frequency being related to the first frequency so that the beat frequency is less than one-fifth of the data frequency;
a first comparator having a first input coupled to the output of said mixer, a second input adapted to receive a first predetermined potential, and an output;
a data code simulator having an output for generating a simulated data code which exhibits a frequency approximately equal to the data frequency;
a first Exclusive-OR element having a first input coupled to the output of said first comparator, a second input coupled to the output of said data code simulator, and an output;
a low pass filter having an input coupled to the output of said first Exclusive-OR element and an output;
a second comparator having a first input coupled to the output of said low pass filter, a second input adapted to receive a second predetermined potential, and an output;
a second Exclusive-OR element having a first input coupled to the output of said second comparator, a second input coupled to the output of said first comparator, and an output;
a third Exclusive-OR element having a first input coupled to the output of said data code simulator, a second input coupled to the output of said second Exclusive-OR element, and an output;
a first AND element having a first input coupled to the output of said third Exclusive-OR element, a second input coupled to the output of said first comparator, and an output;
an envelope detector having an input coupled to the output of said mixer and an output;
a third comparator having a first input coupled to the output of said envelope detector, a second input adapted to receive a third predetermined potential, and an output;
a memory element having a data input coupled to the output of said third comparator, a clock input coupled to the output of said first AND element and an output; and
a second AND element having a first input coupled to the output of said first AND element, a second input coupled to the output of said memory element, and an output.

* * * * *